(12) United States Patent
Teague et al.

(10) Patent No.: US 11,636,772 B2
(45) Date of Patent: Apr. 25, 2023

(54) ESA COLLISION AVOIDANCE SYSTEM AND METHOD

(71) Applicant: Rockwell Collins, Inc., Cedar Rapids, IA (US)

(72) Inventors: Jacob G. Teague, West Melbourne, FL (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 344 days.

(21) Appl. No.: 17/085,095

(22) Filed: Oct. 30, 2020

(65) Prior Publication Data

US 2022/0139241 A1    May 5, 2022

(51) Int. Cl.
| | |
|---|---|
| *G08G 5/04* | (2006.01) |
| *G05D 1/10* | (2006.01) |
| *G01S 13/933* | (2020.01) |
| *G01S 7/00* | (2006.01) |
| *G08G 5/00* | (2006.01) |
| *H01Q 1/28* | (2006.01) |

(52) U.S. Cl.
CPC .............. *G08G 5/045* (2013.01); *G01S 7/006* (2013.01); *G01S 13/933* (2020.01); *G05D 1/1064* (2019.05); *G08G 5/0008* (2013.01); *H01Q 1/28* (2013.01)

(58) Field of Classification Search
CPC .... G08G 5/045; G08G 5/0008; G05D 1/1064; G01S 13/933; G01S 7/006; H01Q 1/28
See application file for complete search history.

(56) References Cited

U.S. PATENT DOCUMENTS

| | | | |
|---|---|---|---|
| 6,133,867 A | 10/2000 | Eberwine et al. | |
| 9,041,587 B2 | 5/2015 | Longstaff | |

(Continued)

FOREIGN PATENT DOCUMENTS

| | | |
|---|---|---|
| CN | 103487798 A | 1/2014 |
| EP | 3470875 A1 | 4/2019 |

OTHER PUBLICATIONS

Extended Search Report in European Application No. 21205075.1 dated Apr. 7, 2022, 10 pages.

*Primary Examiner* — Hunter B Lonsberry
*Assistant Examiner* — Elizabeth Yang
(74) *Attorney, Agent, or Firm* — Suiter Swantz pc llo

(57) ABSTRACT

A system and method for cooperative aerial vehicle collision avoidance provides an ESA-based sensor network capable of high-resolution threat proximity measurements and cooperative and non-cooperative collision avoidance in the full spherical volume surrounding an aerial vehicle. The system incorporates a plurality of ESA panels onto the airframe where the conical scan volumes overlap leaving no gaps in spherical proximity coverage. The resulting received data is stitched together between the neighboring ESA panels and used to determine a position and vector for each threat aerial vehicle within range. The data is transmitted through a cooperative collision avoidance network to nearby aerial vehicles, and presented to the autopilot and flight crew to increase situational awareness. The system determines a maneuver for the aerial vehicle and a maneuver for the threat aerial vehicle based on relative maneuvering capabilities to maintain desired separation.

15 Claims, 8 Drawing Sheets

(56) References Cited

U.S. PATENT DOCUMENTS

| | | | |
|---|---|---|---|
| 9,419,329 | B1 | 8/2016 | West et al. |
| 10,050,336 | B2 | 8/2018 | Wang et al. |
| 10,325,169 | B2 * | 6/2019 | Bar-Nahum ........... G06V 20/41 |
| 11,125,873 | B1 * | 9/2021 | Robertson ............. G01S 7/2813 |
| 2007/0222665 | A1 * | 9/2007 | Koeneman ........... G08G 5/0078 |
| | | | 340/961 |
| 2010/0292871 | A1 * | 11/2010 | Schultz .............. G01C 21/3852 |
| | | | 342/29 |
| 2017/0045613 | A1 * | 2/2017 | Wang .................... G01S 13/343 |
| 2017/0069214 | A1 * | 3/2017 | Dupray ............. H04B 7/18506 |
| 2017/0084183 | A1 | 3/2017 | Knox |
| 2017/0110018 | A1 * | 4/2017 | Wang ................... G08G 5/0008 |
| 2019/0035291 | A1 | 1/2019 | Saxena et al. |
| 2019/0051196 | A1 * | 2/2019 | Kunzi .................. G05D 1/0088 |
| 2020/0271777 | A1 | 8/2020 | Vacanti et al. |
| 2021/0033698 | A1 * | 2/2021 | Heinen ................ G01S 5/0289 |

\* cited by examiner

ESA COLLISION AVOIDANCE SYSTEM AND METHOD

CROSS-REFERENCE TO RELATED APPLICATIONS

The present application is related to U.S. patent application Ser. No. 17/083,075 entitled ESA Based Altimeter, filed 28 Oct. 2020, which is incorporated herein by reference in its entirety.

BACKGROUND

Air traffic density may continue to increase with the advent of urban air mobility (UAM) making timely and accurate threat proximity measurements critical to safety of flight. Furthermore, current collision avoidance systems lack noncooperative target detection in the full spherical volume surrounding an aircraft.

Current systems such as traffic collision avoidance system (TCAS) may function when cooperative aerial vehicles are similarly fitted with the proper hardware. Such hardware may be heavy and undesirable for a small lightweight aerial vehicle with limited power available for operation.

Therefore, a need remains for a system and related method which may overcome these limitations and provide a novel solution to collision avoidance between cooperative and noncooperative aerial vehicles using a lightweight and cost-effective system.

SUMMARY

In one embodiment of the inventive concepts disclosed herein, a system for cooperative aerial vehicle collision avoidance may comprise: a plurality of electronically scanned array (ESA) antenna angularly distributed and mounted onboard a first aerial vehicle, the plurality of ESA antenna configured for a spherical radar coverage around the first aerial vehicle. The system may include a directional communication system onboard the first aerial vehicle configured for a directional collision avoidance communication network (DCACN) between the first aerial vehicle and a threat aerial vehicle and a positioning system onboard the first aerial vehicle configured for providing a three-dimensional (3D) positioning and a velocity of the first aerial vehicle.

For control, the system may include a controller onboard the first aerial vehicle operatively coupled with each of the plurality of ESA antenna, the directional communication system, and the positioning system and a tangible, non-transitory memory onboard the first aerial vehicle configured to communicate with the controller, the tangible, non-transitory memory maintains a first maneuvering capability of the first aerial vehicle, the tangible, non-transitory memory having instructions stored therein that, in response to execution by the controller, cause the controller to carry out each function of the system for cooperative aerial vehicle collision avoidance.

In function, the system may receive a first 3D position and a first vector of the first aerial vehicle from the positioning system and command the plurality of ESA antenna to sense the threat aerial vehicle via the plurality of ESA antenna. The system may also receive a sensed data from the plurality of ESA antenna the sensed data representative of the threat aerial vehicle and determine a threat position and a threat vector of the threat aerial vehicle based on the sensed data.

The system may also establish the DCACN between the first aerial vehicle and the threat aerial vehicle via the directional communication system and communicate with the threat aerial vehicle via the DCACN. To ensure the correct aerial vehicle may maneuver, the system may determine a threat maneuvering capability of the threat aerial vehicle based on one of: a received signal including a certification maneuvering category via the DCACN, a size-based maneuvering category based on the sensed data, and a speed-based maneuvering category based on the threat vector and compare the threat maneuvering capability with the first maneuvering capability.

The system may further generate a first maneuver for the first aerial vehicle and a threat maneuver for the threat aerial vehicle based on the first position, the first vector, the threat position, the threat vector, and the comparison, each of the first maneuver and the threat maneuver configured to provide a separation between the first aerial vehicle and the threat aerial vehicle and direct a pilot and an autopilot onboard the first aerial vehicle to execute the first maneuver.

An additional embodiment of the inventive concepts disclosed herein may include a method for cooperative aerial vehicle collision avoidance. The method may include receiving a first position and a first vector of a first aerial vehicle from a positioning system onboard the first aerial vehicle and receiving a first maneuvering capability of the first aerial vehicle.

The method may also include commanding a plurality of ESA antenna angularly distributed and mounted onboard the first aerial vehicle to sense a threat aerial vehicle, receiving a sensed data from the plurality of ESA antenna, the sensed data representative of the threat aerial vehicle, and determining a threat position and a threat vector of the threat aerial vehicle based on the sensed data.

For communication, the method may include establishing a directional collision avoidance communication network (DCACN) between the first aerial vehicle and the threat aerial vehicle via a directional communication system and communicating with the threat aerial vehicle via the DCACN.

To determine which aerial vehicle may maneuver, the method may include determining a threat maneuvering capability of the threat aerial vehicle based on one of: a received signal including a certification maneuvering category via the DCACN, a size-based maneuvering category based on the sensed data, and a speed-based maneuvering category based on the threat vector and comparing the threat maneuvering capability with the first maneuvering capability.

The method may further include generating a first maneuver for the first aerial vehicle and a threat maneuver for the threat aerial vehicle based on the first position, the first vector, the threat position, the threat vector, and the comparison, each of the first maneuver and the threat maneuver configured to provide a separation between the first aerial vehicle and the threat aerial vehicle and directing a pilot and an autopilot onboard the first aerial vehicle to execute the first maneuver.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
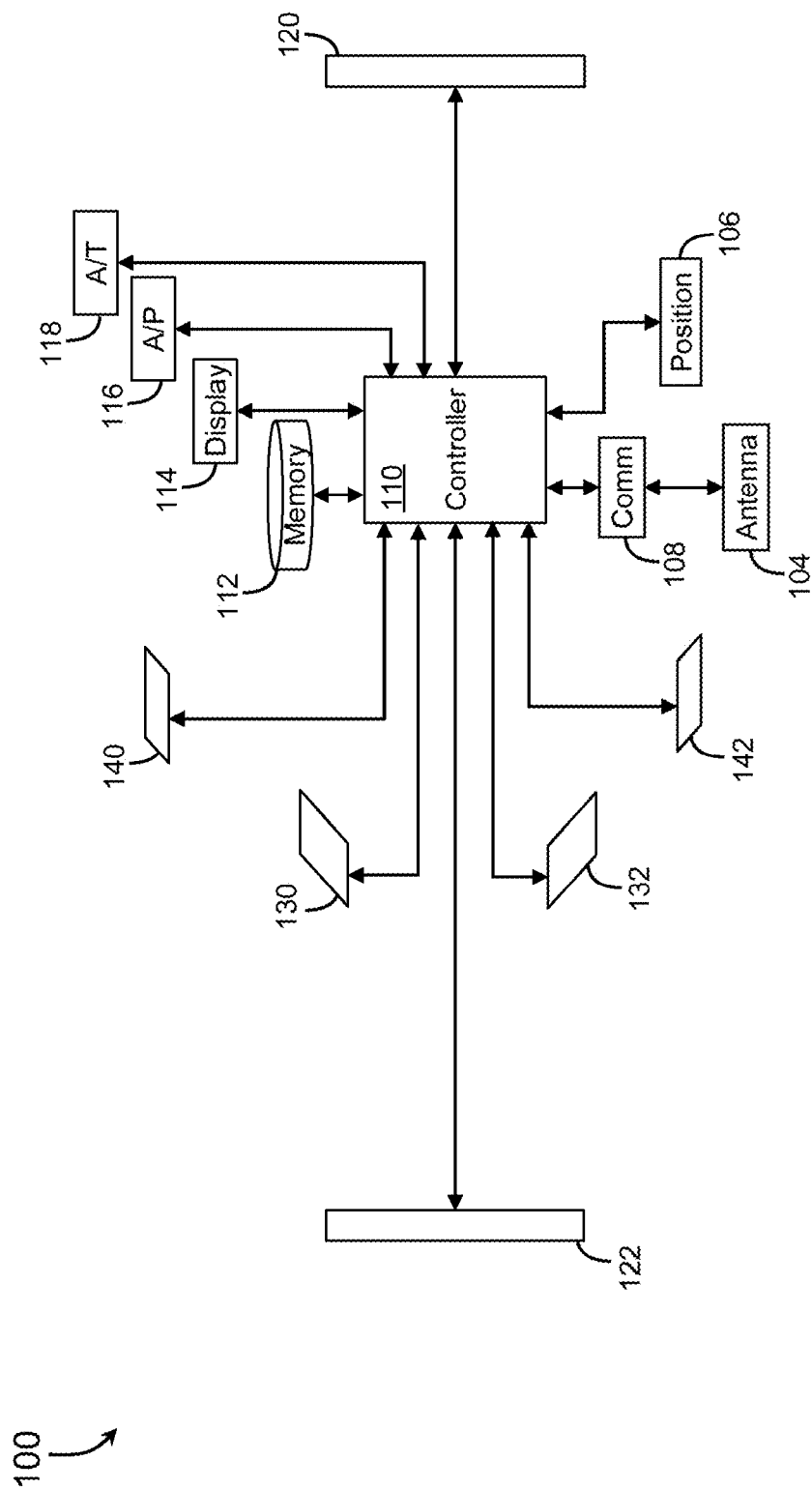
FIG. 1 is a diagram of a system for cooperative aerial vehicle collision avoidance in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for cooperative aerial vehicle collision avoidance. The system provides an ESA-based sensor network capable of high-resolution threat proximity measurements and cooperative and non-cooperative collision avoidance in the full spherical volume surrounding an aerial vehicle. The system incorporates a plurality of ESA panels onto the airframe where the conical scan volumes overlap leaving no gaps in spherical proximity coverage. The resulting received data is stitched together between the neighboring ESA panels and used to determine a position and vector for each threat aerial vehicle within range. The data is transmitted through a cooperative collision avoidance network to nearby aerial vehicles, and presented to the autopilot and flight crew to increase situational awareness. The system determines a maneuver for the aerial vehicle and a maneuver for the threat aerial vehicle based on relative maneuvering capabilities to maintain desired separation.

| REFERENCE CHART | |
|---|---|
| 100 | System Diagram |
| 104 | Communications Antenna |
| 106 | Positioning System |
| 108 | Communication System |
| 110 | Controller |
| 112 | Memory |
| 114 | Display |
| 116 | Autopilot System |
| 118 | Auto Throttle System |
| 120 | Forward ESA Panel |
| 122 | Aft ESA Panel |
| 130 | Left ESA Panel |
| 132 | Right ESA Panel |
| 140 | Top ESA Panel |

-continued

REFERENCE CHART

| | |
|---|---|
| 142 | Bottom ESA Panel |
| 200 | Vertical Scan Volume |
| 210 | Aerial Vehicle (AV) |
| 220 | Forward Scan Volume |
| 222 | Aft Scan Volume |
| 230 | Left Scan Volume |
| 232 | Right Scan Volume |
| 240 | Top Scan Volume |
| 242 | Bottom Scan Volume |
| 280 | Threat Aerial Vehicle |
| 290 | Threat Aerial Vehicle n |
| 300 | Horizontal Scan Volume |
| 400 | CA Logic Processing |
| 410 | First Aerial Vehicle Collision Avoidance (CA) Process |
| 440 | ESA Modules |
| 450 | Dynamic Collision Avoidance Communication Network (DCACN) |
| 460 | CA Process |
| 480 | Threat Aerial Vehicle CA Process |
| 490 | Threat Aerial Vehicle n CA Process |
| 500 | Scenario Example |
| 510 | First AV Scan Volume |
| 512 | First AV Vector |
| 514 | First Maneuver |
| 520 | Threat AV n Scan Volume |
| 522 | Threat AV n Vector |
| 530 | Threat AV Scan Volume |
| 532 | Threat AV Vector |
| 534 | Threat Maneuver |
| 550 | Exemplary Datum |
| 600 | ESA Panel Cooperation |
| 602 | 000 Relative Scan Volume |
| 604 | 045 Relative Scan Volume |
| 606 | 090 Relative Scan Volume |
| 608 | 135 Relative Scan Volume |
| 610 | 180 Relative Scan Volume |
| 612 | 225 Relative Scan Volume |
| 614 | 270 Relative Scan Volume |
| 616 | 315 Relative Scan Volume |
| 618 | Combined ESA Scan Volume |
| 680 | Threat Aerial Vehicle Position |
| 682 | Threat Aerial Vehicle Azimuth |
| 700 | Congestion Diagram |
| 702 | Airport Congestion |
| 704 | UAS Congestion |
| 800 | Method Flow |

FIG. 1 System Description

Referring to FIG. 1, a diagram of a system for cooperative aerial vehicle collision avoidance 100 in accordance with an embodiment of the inventive concepts disclosed herein is shown. Generally, the system for cooperative aerial vehicle collision avoidance 100 may include a plurality of electronically scanned array (ESA) antenna angularly distributed and mounted onboard a first aerial vehicle, the plurality of ESA antenna configured for a spherical radar coverage around the first aerial vehicle. The plurality of ESA antenna may include a forward ESA panel 120, an aft ESA panel 122, a left ESA panel 130, a right ESA panel 132, a top ESA panel 140, and a bottom ESA panel 142.

In one embodiment of the inventive concepts disclosed herein, the system for cooperative aerial vehicle collision avoidance 100 may include the plurality of ESA antenna including at least six ESA antenna oriented in a forward aft left right top bottom configuration each of the at least six ESA antenna separated by 90 degrees. In another, exemplary embodiment, eight ESA antenna may encircle the first aerial vehicle on a horizontal plane while the top and bottom ESA antenna may provide radar coverage about a vertical plane.

The system for cooperative aerial vehicle collision avoidance 100 may also include an antenna 104 operative with a directional communication system 108, a positioning system 106, a pilot display 114, an autopilot 116, and an auto throttle system 118.

The directional communication system 108 may be configured for a directional collision avoidance communication network (DCACN) between the first aerial vehicle and a plurality of additional aerial vehicles one of which may be a threat aerial vehicle to the first aerial vehicle. In embodiments, the directional communication system sends and receives a data signal via the plurality of ESA antenna or a directional communications antenna 104.

The positioning system 106 may be an inertial system (e.g., inertial, global navigation satellite system (GNSS), global positioning system (GPS)) onboard the first aerial vehicle configured for providing a three-dimensional (3D) positioning and a velocity of the first aerial vehicle. The positioning system 106 may provide a position and a vector (e.g., speed, horizontal track, vertical track) for the first aerial vehicle.

In one embodiment of the inventive concepts disclosed herein, the system for cooperative aerial vehicle collision avoidance 100 may be operative and functional onboard a manned aircraft wherein the pilot display 114 may be of use. However, contemplated herein, the system for cooperative aerial vehicle collision avoidance 100 may be functional and operative onboard an unmanned aircraft system (UAS) wherein the autopilot 116 and the autothrottle system 118 may be of interest. In addition, an urban air mobility (UAM) aerial vehicle may be subject to a variety of traffic concerns during a normal flight within a city. Embodiments herein may directly apply to use by the UAM community.

The system for cooperative aerial vehicle collision avoidance 100 may further include a controller 110 onboard the first aerial vehicle operatively coupled with each of the plurality of ESA antenna, the directional communication system, and the positioning system. The controller 110 may operatively couple with a tangible, non-transitory memory 112 onboard the first aerial vehicle configured to communicate with the controller, the tangible, non-transitory memory maintains a first maneuvering capability of the first aerial vehicle, the tangible, non-transitory memory having instructions stored therein that, in response to execution by the controller, cause the controller to carry out each of the functions of the system for cooperative aerial vehicle collision avoidance 100.

FIG. 2

Figure 2:
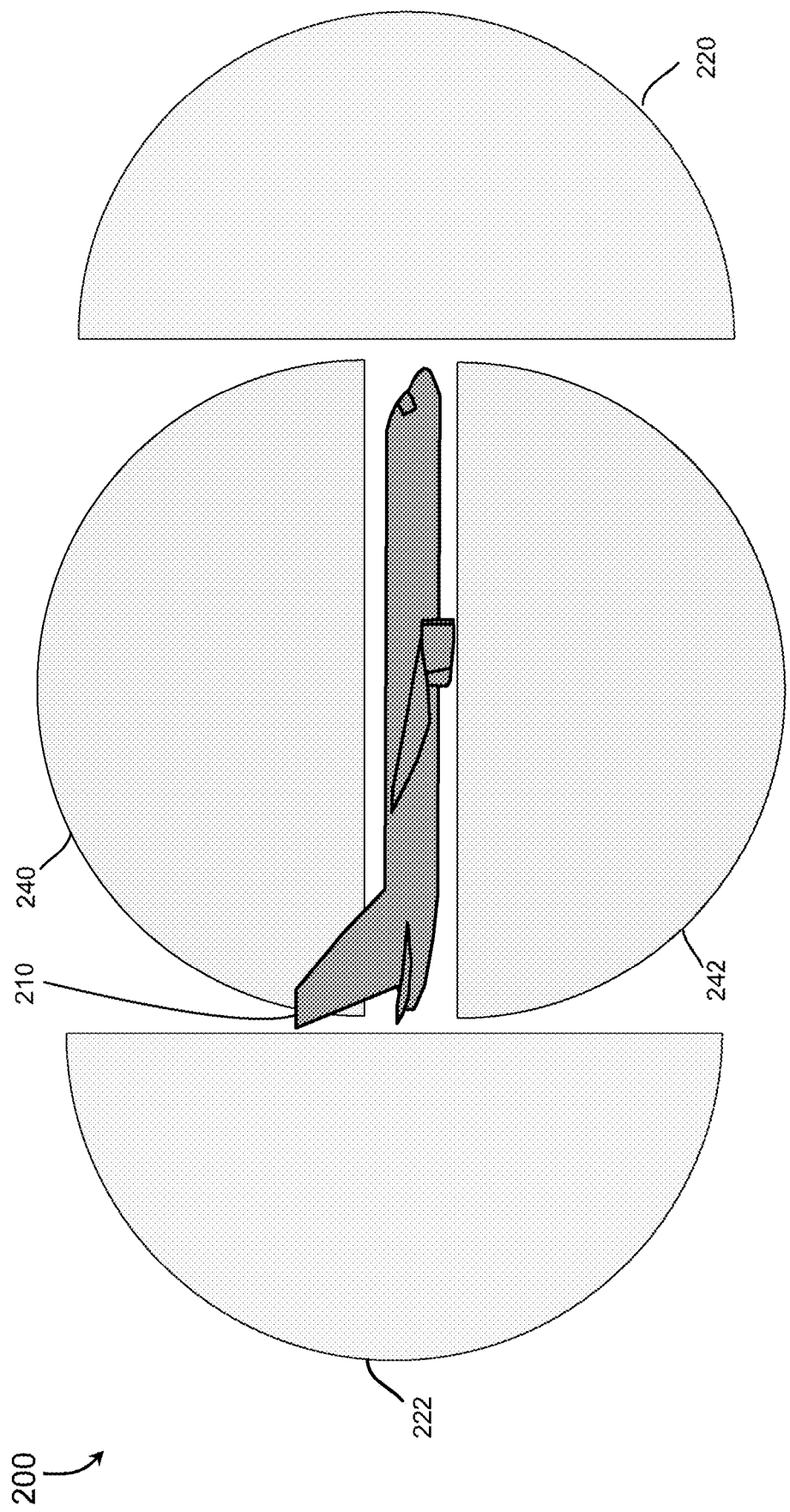
FIG. 2 is a horizontal diagram of a vertical scan volume in accordance with an embodiment of the inventive concepts disclosed herein.

Referring now to FIG. 2, a horizontal diagram of a vertical scan volume 200 in accordance with an embodiment of the inventive concepts disclosed herein is shown. The top ESA 140 and the bottom ESA 142 may function to provide a 360 scan volume around a vertical plane using a top scan volume 240 and a bottom scan volume 242 to sense any aerial vehicle within the scan volumes around a first aerial vehicle 210.

In one embodiment, the system 100 may enable hemispherical coverage via employment of a single ESA. Therefore, two ESA may function to provide the spherical coverage around the aircraft 210. This may be possible with a non-planar or conformal ESA aperture offering greater than +/−90 degrees in accurate coverage. In embodiments, multiple planar ESA panels, conformal (2D or 3D curved ESA apertures), and additional non-planar ESA apertures may fall directly within the scope of the inventive concepts disclosed herein.

FIG. 3

Figure 3:
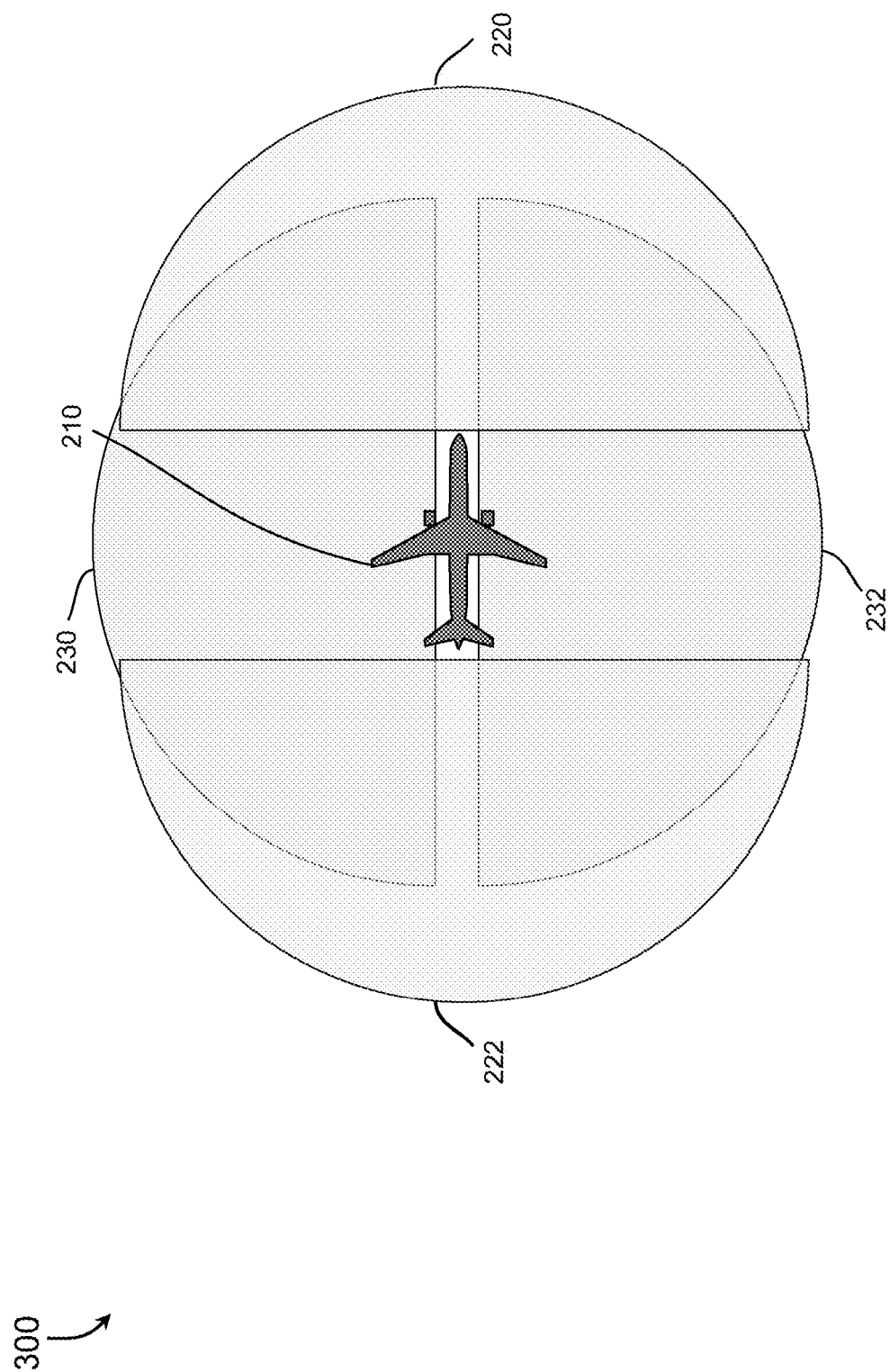
FIG. 3 is a vertical diagram of a horizontal scan volume exemplary of an embodiment of the inventive concepts disclosed herein.

Referring to FIG. 3, a vertical diagram of a horizontal scan volume exemplary of an embodiment of the inventive concepts disclosed herein is shown. The horizontal scan volume 300 may indicate a 360 degree scan volume around a horizontal plane. In one embodiment, the system for cooperative aerial vehicle collision avoidance 100 may include a Forward Scan Volume 220 provided by the forward ESA antenna 120, an Aft Scan Volume 222 provided by the aft ESA antenna 122, a Left Scan Volume 230 provided by the left ESA antenna 130, and a Right Scan Volume 232 provided by the right ESA antenna 132.

In one embodiment of the inventive concepts disclosed herein, the system for cooperative aerial vehicle collision avoidance 100 may provide the spherical scan volume around the first aerial vehicle 210 using a minimum number of ESA antenna. In one exemplary embodiment, four ESA antenna panels (e.g., forward, aft, left, right) may provide the minimum coverage to generate the spherical scan volume.

FIG. 4

Figure 4:
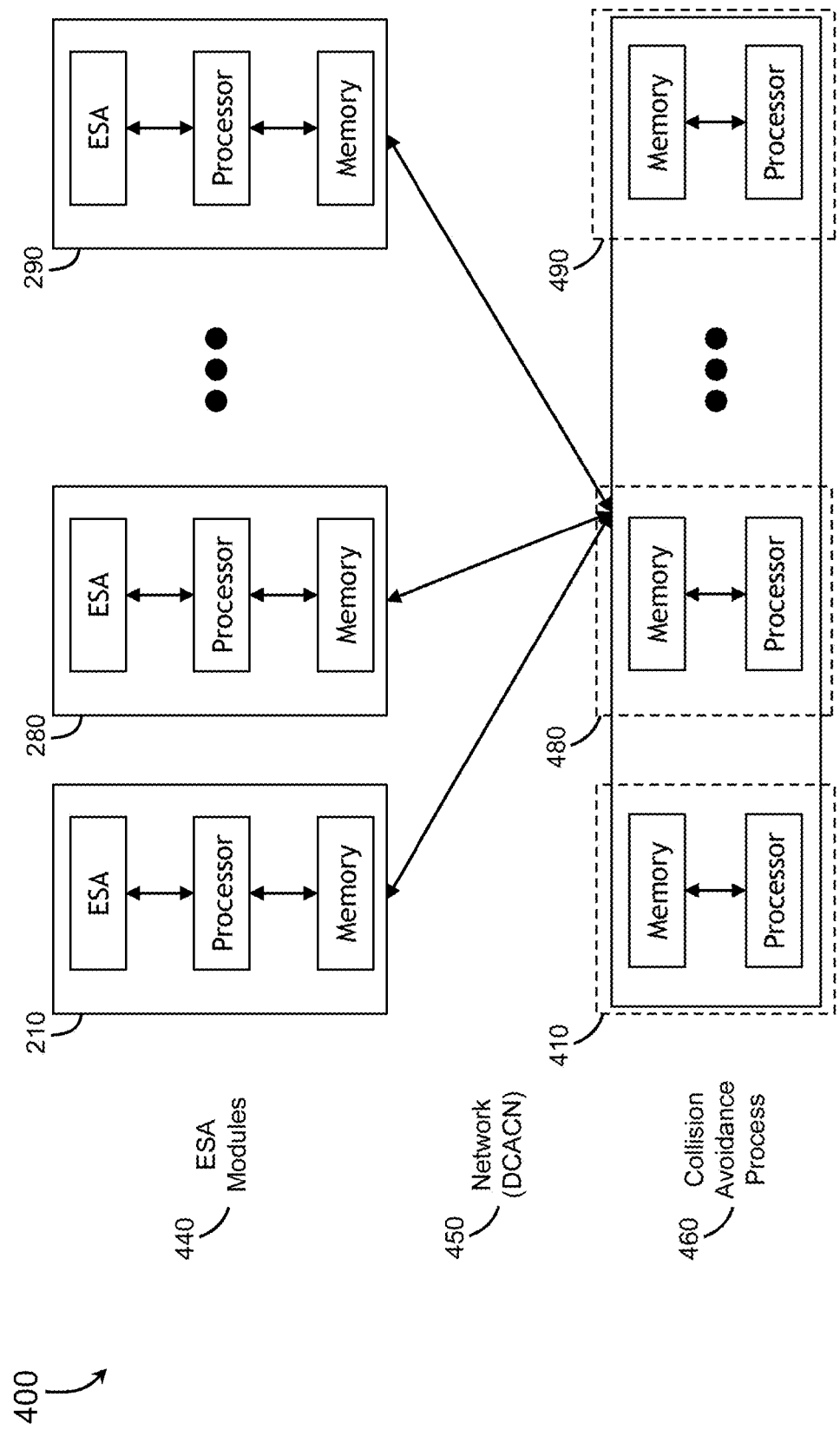
FIG. 4 is a diagram of an exemplary collision avoidance processing of one embodiment of the inventive concepts disclosed herein.

Referring now to FIG. 4, a diagram of an exemplary collision avoidance processing of one embodiment of the inventive concepts disclosed herein is shown. A Logic Diagram 400 may include a plurality of ESA modules 440, the DCACN 450 and a cooperative collision avoidance (CA) process 460. Each of the ESA modules 440 including onboard the aerial vehicle 210, the threat aerial vehicle 280, and a threat aerial vehicle n 290 may function to sense another aerial vehicle.

The DCACN 450 may function to enable data communication between each of the aerial vehicles (the first, the threat and the nth) enabling the cooperative CA process 460. Each of an aerial vehicle CA process 410, a threat aerial vehicle CA process 480 and a threat aerial vehicle n CA process 490 may each function to process the received data and cooperatively determine appropriate maneuvers for each aerial vehicle.

In one embodiment of the inventive concepts disclosed herein, the DCACN 450 may function to alert nearby aircraft within VHF range of the DCACN 450 yet outside a radar range of the plurality of ESA antenna 120-142. The DCACN 450 may function as a situational awareness network between each aerial vehicle within VHF range of one or more of the similarly equipped aerial vehicles. In embodiments, the DCACN 450 may enable awareness of a continuously operating air picture with positions and vectors of each aerial vehicle within radar range of at least one aerial vehicle with the plurality of ESA antenna 120-142.

Figure 5:
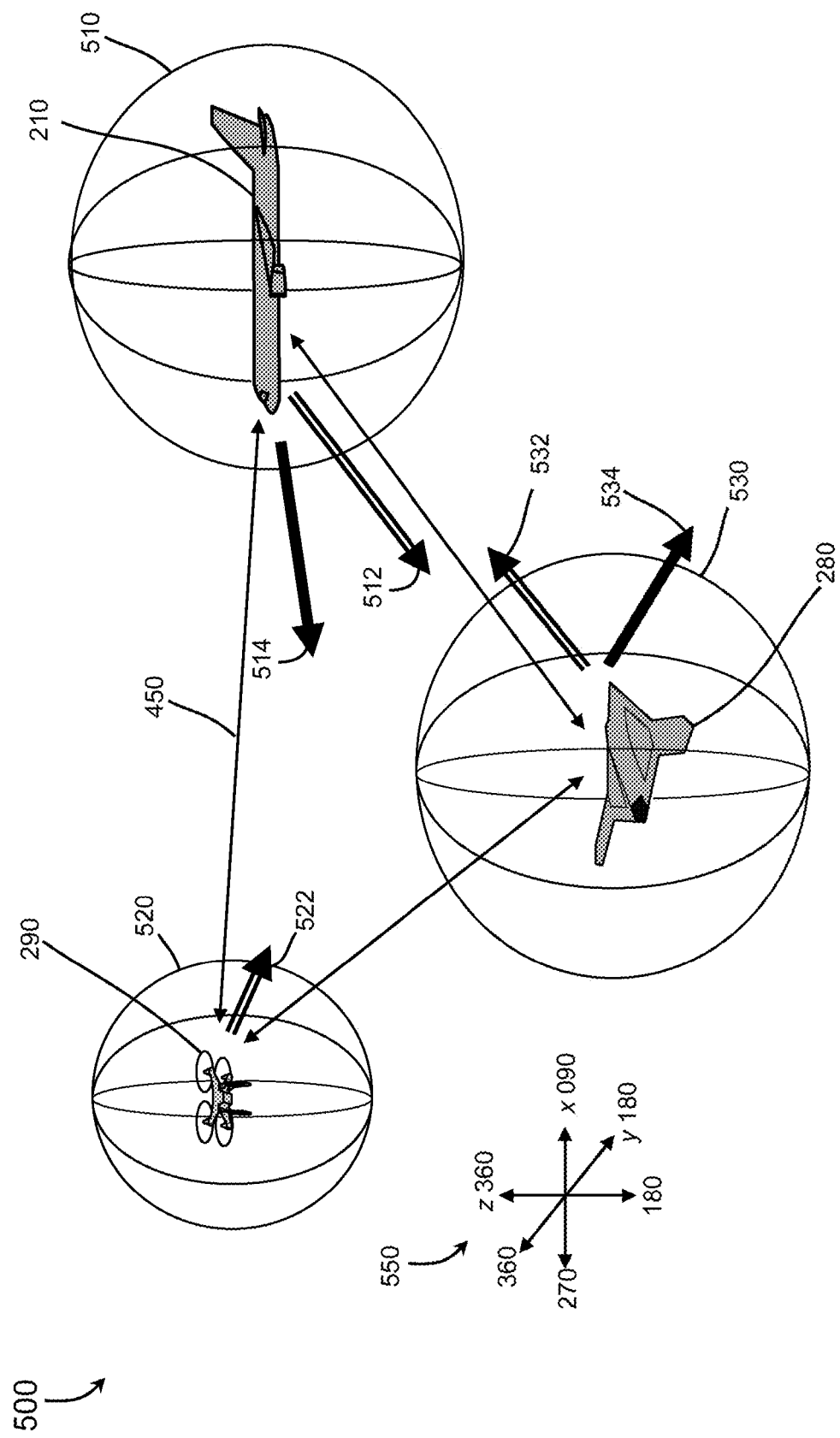
FIG. 5 is a diagram of an exemplary scenario in accordance with one embodiment of the inventive concepts disclosed herein.

FIG. 5 System Function

Referring now to FIG. 5, a diagram of an exemplary scenario 500 in accordance with one embodiment of the inventive concepts disclosed herein is shown. In one embodiment of the inventive concepts disclosed herein, the system for cooperative aerial vehicle collision avoidance 100 may function to receive a first 3D position and a first vector 512 of the first aerial vehicle 210 from the positioning system 106. The controller 110 may then command the plurality of ESA antenna to sense the threat aerial vehicle via the plurality of ESA antenna having a spherical aerial vehicle scan volume 510.

The first aerial vehicle 210 may encounter the threat aerial vehicle 280 and be on a collision course where the first aerial vehicle 210 may have the first vector 512 and the threat aerial vehicle 280 may have a threat vector 532.

As used herein, the term vector may describe a 3D track and a velocity of the aerial vehicle. The track may be relative to a known datum (e.g., latitude, longitude, magnetic heading) and the velocity may be also a known reference (e.g., ground speed in knots). For example, one vector may include a climbing heading of 090 with a groundspeed of 320 knots. In this manner, each aerial vehicle may refer to the same reference values in determining the appropriate maneuver for collision avoidance. One exemplary reference datum 550 may include an x axis at 090, a y axis at 180, and a z axis at a vertical.

In the FIG. 5 example scenario, the first aerial vehicle 210 may have a descending vector on a heading of 270 magnetic at a speed of 280 knots (KTS) ground speed (GS) while the threat aerial vehicle may be on a climbing vector heading 060 magnetic at a speed of 220 KTS GS. The threat aerial vehicle 280 may also be fitted with the plurality of ESA antenna having the spherical scan volume 530.

The controller 110 may receive a sensed data from the plurality of ESA antenna 120-142, the sensed data representative of the threat aerial vehicle 280 and from the sensed data and the known position, determine a threat position and a threat vector 532 of the threat aerial vehicle 280 based on the sensed data.

The controller 110 may establish the DCACN 450 between the first aerial vehicle 210 and one or more of the threat aerial vehicle 280 via the directional communication system 108. In embodiments, the controller 110 may employ the plurality of ESA antenna 120-142 in the directional communication with other aerial vehicles. In another embodiment, the controller 110 may communicate with one or more additional antenna 104 coupled with the communication system 108. Once the DCACN 450 is established, the controller 110 may communicate with the threat aerial vehicle 280 via the DCACN 450. In one embodiment of the inventive concepts disclosed herein, the DCACN 450 may be a dynamic mobile ad hoc network (MANET).

Each aerial vehicle may possess variable maneuvering ability in speed, pitch, roll, and yaw based on a wide variety of factors. For example, a small UAS may be able to turn 180 degrees within 100 feet of forward travel while a B767 may require more than a mile to turn based on speed, weight, and ambient pressure. Embodiments of the inventive concepts herein may account for the wide variety of maneuvering limitations in determining the proper maneuver for each aerial vehicle.

In embodiments, the controller 110 may determine a threat maneuvering capability of the threat aerial vehicle 280 based on a received signal including a certification maneuvering category via the DCACN 450, a size-based maneuvering category based on the sensed data, and a speed-based maneuvering category based on the threat vector 532. In one embodiment, the certification maneuvering category is based on a reference speed and further includes: a category A wherein the reference speed is less than 91 knots, a category B wherein the reference speed is at least 91 knots but less than 121 knots, a category C wherein the reference speed is at least 121 knots but less than 141 knots, a category D wherein the reference speed is at least 141 knots but less than 166 knots, and a category E wherein the reference speed is 166 knots or greater. The threat aerial vehicle 280 may transmit the certification maneuvering category to the first aerial vehicle via the received signal.

Additionally, the first aerial vehicle 210 may determine the size-based threat maneuvering category based on a power of the returned radar signal. The controller 110 may measure a power level of the received radar signal from the threat aerial vehicle 280 and determine the size-based maneuvering category is based on the power level of the received radar signal.

For example, a greater radar return may indicate a greater radar cross section (RCS) of the threat aerial vehicle 280 and therefore indicate the size of the threat aerial vehicle. In this manner, a greater size may equate to a reduced maneuvering capability and the controller may account for the size of the threat aerial vehicle in determining the maneuver for each vehicle.

In one embodiment, the controller 110 may determine the threat maneuvering capability based on the threat vector 532. For example, a faster threat aerial vehicle 280 having a faster threat vector 532 may be less maneuverable than a slower threat aerial vehicle 280.

The controller 110 may compare the threat maneuvering capability of the threat aerial vehicle 280 with the first maneuvering capability of the first aerial vehicle 210. This comparison may include relative size, relative maneuvering category, relative speed, etc. The controller 110 may then generate a first maneuver 514 for the first aerial vehicle 210 and a threat maneuver 534 for the threat aerial vehicle 280 based on the first position, the first vector 512, the threat position, the threat vector 532, and the comparison. Each of the first maneuver 514 and the threat maneuver 534 configured to provide a separation between the first aerial vehicle 210 and the threat aerial vehicle 280.

In one embodiment of the inventive concepts disclosed herein, the separation may be a statutory separation such as a 1 mile horizontal and 500 ft vertical separation. Another exemplary separation may include merely a measured (e.g., 500 ft) bubble around each of the first aerial vehicle 210 and the threat aerial vehicle 280. In another embodiment, the separation may be based (and greater) on whether a human is in one of the aerial vehicles. Here, a range may be based on the human occupancy of the first aerial vehicle 210. For example, two small UAS operating as the first 210 and the threat 280 aerial vehicles may require only a 50 foot bubble of separation between the small UAS. However, two B787 aircraft with many humans onboard may require a greater separation based on the souls on board.

In one embodiment of the inventive concepts disclosed herein, the controller 110 may determine that first maneuver 514 or the threat maneuver 534 may be a non-maneuver based on the comparison of the threat maneuvering capability with the first maneuvering capability.

In the FIG. 5 example, the controller 110 may determine a slight maneuver for the first aerial vehicle 210 based on size and human onboard and a significant threat maneuver based on the slower unmanned UAS of the threat aerial vehicle 280. Here, the large manned aircraft of the first aerial vehicle 210 may slightly decrease a rate of descent to execute the first maneuver 514 while the smaller UAS operating as the threat aerial vehicle 280 may transition from a climb in the threat vector 532 to a descent in the threat maneuver 534.

In one embodiment, the controller 110 may determine the first maneuver and the threat maneuver may include a turn, a climb, a descent, a vertical speed change, a speed reduction, a power reduction, a speed increase, a power increase, and a non-maneuver. In addition, a magnitude of each maneuver may be based on the maneuvering capability comparison. Here, the first maneuver 514 and the threat maneuver 534 may include a maneuver magnitude based on the comparison between the threat maneuvering capability and the first maneuvering capability.

In embodiments, the controller 110 may determine a range at which the maneuver may be required. In embodiments, a maneuver range for each of the first maneuver 514 and the threat maneuver 534 may be based on the comparison between the threat maneuvering capability and the first maneuvering capability. For example, two high speed B787 aircraft may be required to begin a maneuver at a maneuver range of 10-15 miles to make the maneuver comfortable for the human passengers. Conversely, two small UAS may delay until a maneuver range of 100 feet before the controller may direct the maneuver.

Once determined, the controller 110 may direct a pilot onboard a manned aerial vehicle and an autopilot onboard a UAS of the first aerial vehicle to execute the first maneuver. The direction may be presented to the pilot or autopilot 116 in a variety of presentations including a head up or head mounted display, a virtual head mounted display and via a 3D display to increase situational awareness. In an UAS and UAM incorporation, the controller 110 may direct the autopilot 116 and autothrottle system 118 to perform the first maneuver 514.

Once the first aerial vehicle 210 completes the first maneuver 514, the controller 110 may continue to function to sense each threat aerial vehicle n 290 with associated vector 522 a spherical scan volume 520 within range of the plurality of ESA antenna 120-142.

In one embodiment of the inventive concepts disclosed herein, the controller 110 may direct the first aerial vehicle 210 to perform the first maneuver to avoid a non-cooperative threat aerial vehicle. In this manner, the first aerial vehicle 210 may rely on the size based maneuvering category since a non-cooperative aerial vehicle may not possess the communication to enable the DCACN 450. In this situation, the first aerial vehicle 210 may sense the threat aerial vehicle 280, determine the position, vector, and maneuvering capability based on the sensed data, and autonomously execute the first maneuver to maintain the separation.

FIG. 6

Figure 6:
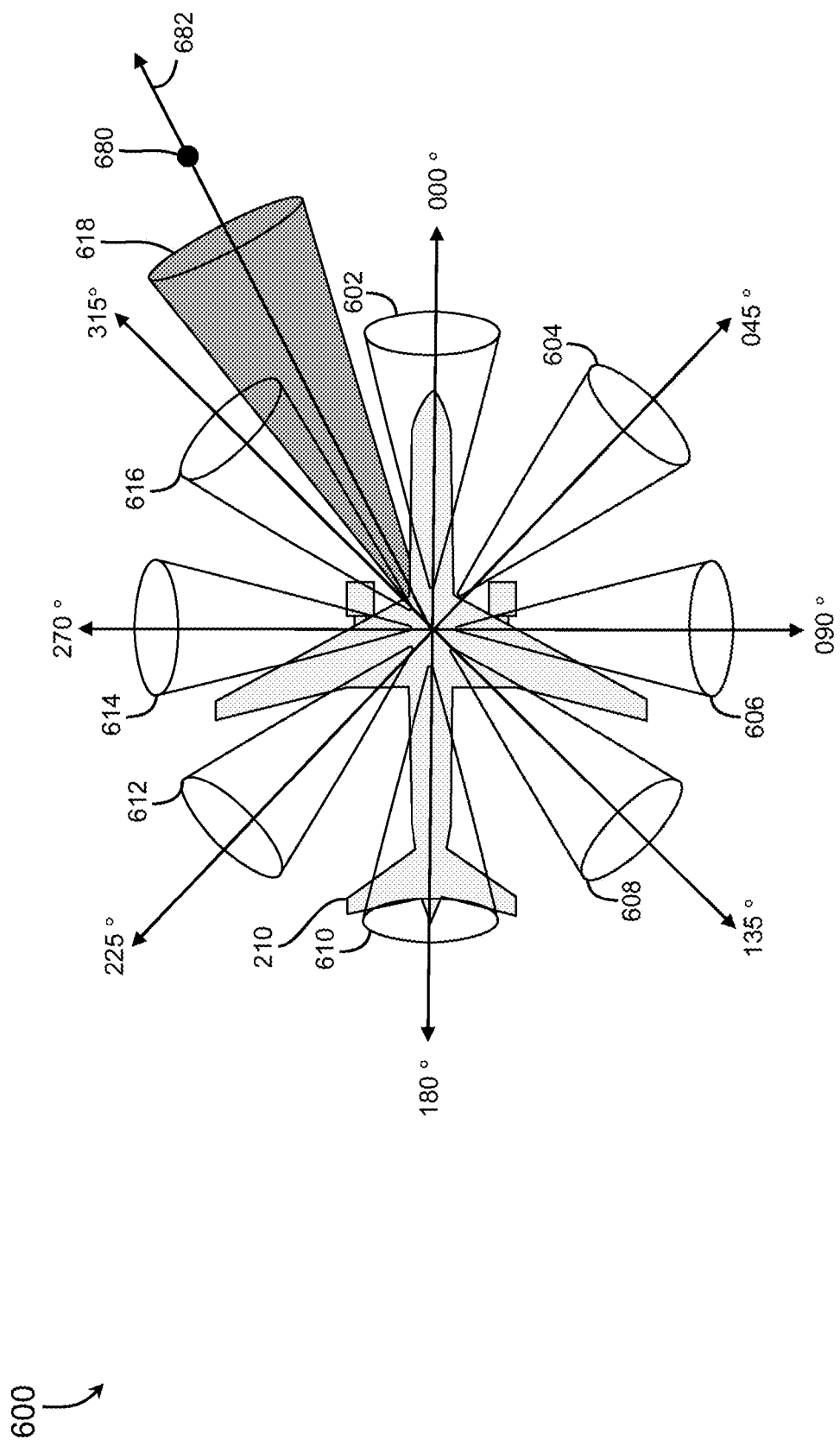
FIG. 6 is a diagram of an exemplary ESA panel cooperation in accordance with one embodiment of the inventive concepts disclosed herein.

Referring now to FIG. 6, a diagram of an exemplary ESA panel cooperation 600 in accordance with one embodiment of the inventive concepts disclosed herein is shown. In one embodiment of the inventive concepts disclosed herein, the plurality of ESA antenna 120-142 may function independently as well as function cooperatively to mitigate a sector crossover effect at an azimuth between adjacent ESA antenna elements.

Each ESA panel may be suited for a directional radiation where a maximum reception azimuth is aligned with a boresight of the ESA panel. Here, a gain may modulate with azimuth and may dip near a midpoint between a first ESA azimuth and an adjacent ESA azimuth. Each ESA panel may experience a scalloping of gain at an azimuthal border of the ESA scan volume (e.g. far left or far right). Here, at a non-peak side of a receive pattern, gain may be reduced and targets at the sector crossover may be less likely to be accurately sensed.

For example, a first ESA panel may be oriented at an azimuth of 000 degrees relative and maintain a 000 degree relative scan volume 602 while a second ESA panel adjacent to the first may maintain a boresight at a relative 315 degree azimuth (e.g., 45 degrees left of the nose) with a 315 degree relative scan volume 616.

In one embodiment of the inventive concepts disclosed herein, the controller 110 may be configured to command the plurality of ESA antenna to sense the threat aerial vehicle via a first ESA antenna and a second ESA antenna, the second ESA antenna adjacent to the first ESA antenna. The controller 110 may also determine the threat aerial vehicle position 680 is within a sector crossover between a first boresight (e.g., 000 relative) of the first ESA antenna and a second boresight (e.g., 315 relative) of the second ESA antenna.

In one embodiment of the inventive concepts disclosed herein, the controller 110 may electrically manipulate each of the first ESA antenna and the second ESA antenna coherently summed to operate as an aggregate ESA antenna having a combined scan volume 618 along a threat aerial vehicle azimuth 682 between the first boresight (000 relative) and the second boresight (315 relative). Once manipulated, the controller 110 may receive the sensed data from the combined ESA antenna.

The controller 110 may dynamically enable and disable the electrical manipulation to ensure accurate sensing of each threat aerial vehicle within each sector crossover around the first aerial vehicle. The controller may enable adjacent ESA panels to accurately determine the position of the threats. Each of the ESA panels having a 045 relative scan volume 604, a 090 relative scan volume 606, a 135 relative scan volume 608, a 180 relative scan volume 610, a 225 relative scan volume 612, and a 270 relative scan volume 614 may be candidate ESA panels for the dynamic electrical manipulation.

FIG. 7

Figure 7:
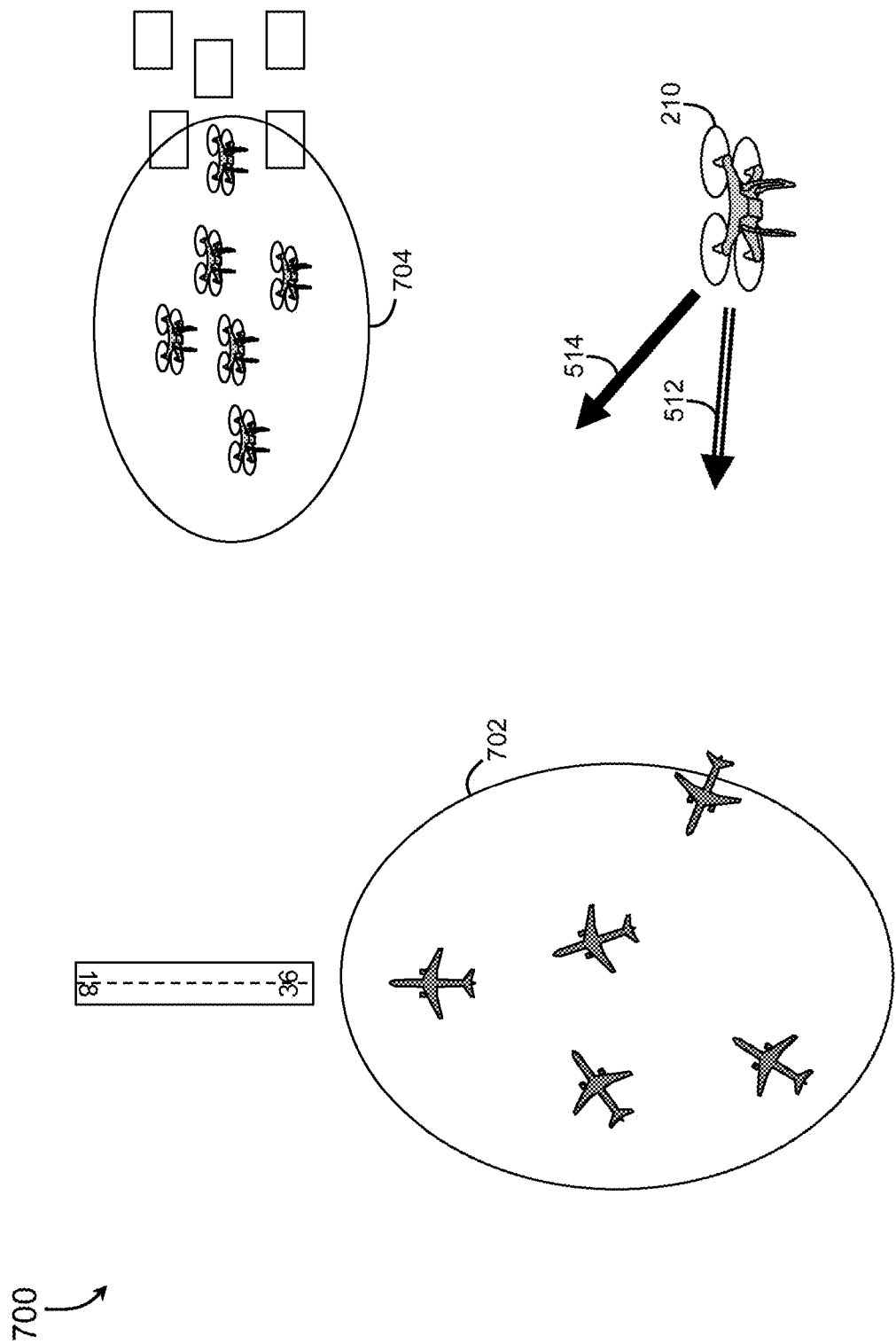
FIG. 7 a diagram of an exemplary congestion location associated with one embodiment of the inventive concepts disclosed herein.

Referring now to FIG. 7, a diagram of an exemplary congestion location 700 associated with one embodiment of the inventive concepts disclosed herein is shown. In one embodiment of the inventive concepts disclosed herein, the controller 110 function may include storing the threat position, the threat vector, a threat time, and the threat maneuvering capability as a threat instance within the memory 112. During operation, the controller 110 may retrieve a threat instance from the memory and determine a multiple of threat instance is a congestion location. In this manner, the controller 110 may sense the multiple of the threat instance as four or 10 of the threat aerial vehicles in the same location and determine the location where the multiple threats are present may be the congestion location.

In one embodiment of the inventive concepts disclosed herein, the congestion location may be an airport congestion location 702 as well as a UAS congestion location 704. Once labeled as the congestion location, the controller 110 may function to direct the pilot or the autopilot onboard the first aerial vehicle to avoid the congestion location. This avoidance may be a preflight planning element as well as an inflight first maneuver 514 to enable the first aerial vehicle 210 to remain clear of the congestion location.

FIG. 8

Figure 8:
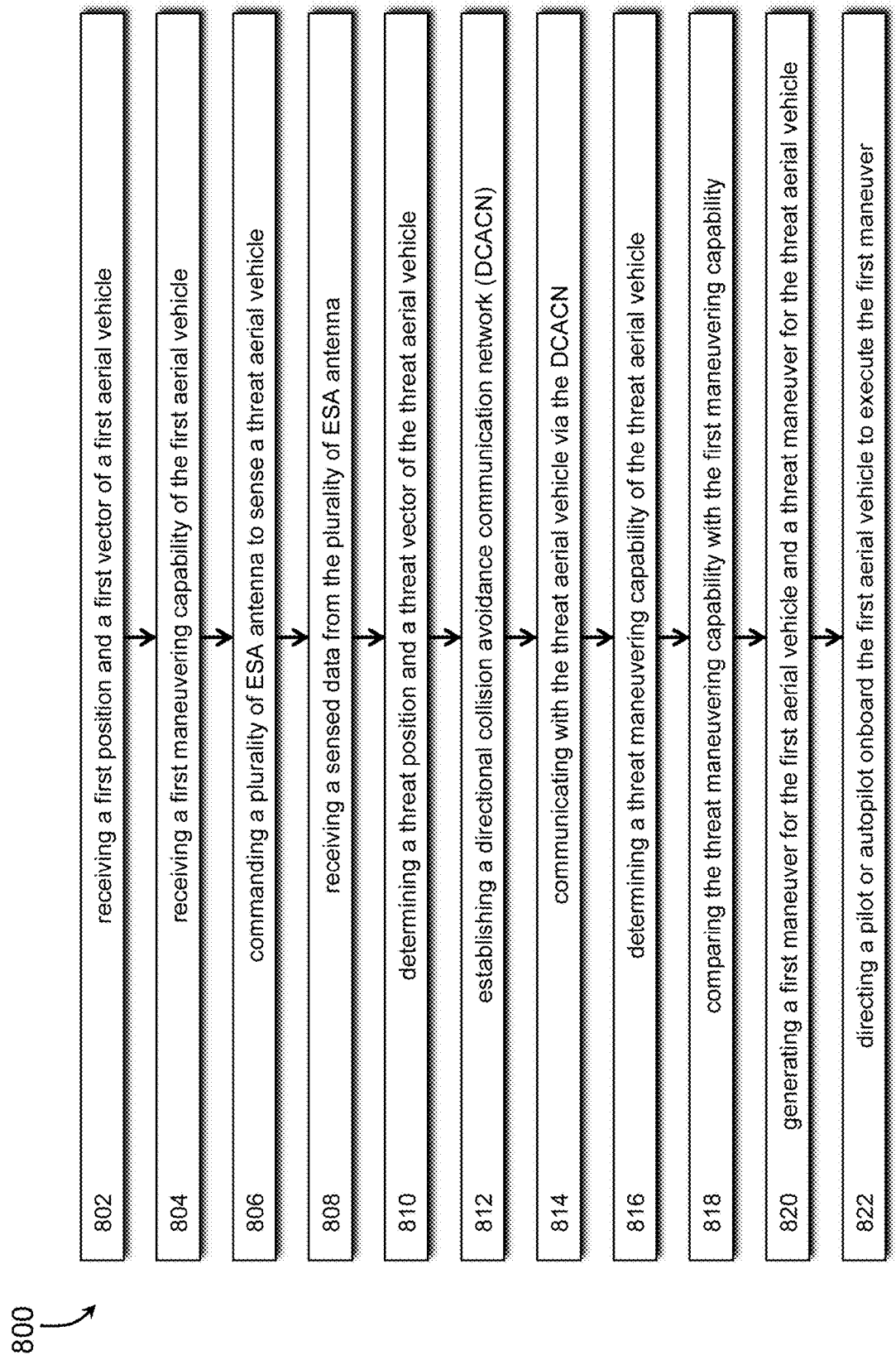
FIG. 8 a diagram of an exemplary method flow associated with one embodiment of the inventive concepts disclosed herein.

Referring now to FIG. 8, a diagram of an exemplary method flow 800 associated with one embodiment of the inventive concepts disclosed herein is shown. The method flow 800 may include, at a step 802, receiving a first position and a first vector of a first aerial vehicle from a positioning system onboard the first aerial vehicle, and, at a step 804, receiving a first maneuvering capability of the first aerial vehicle. A step 806 may include commanding a plurality of ESA antenna angularly distributed and mounted onboard the first aerial vehicle to sense a threat aerial vehicle, and a step 808 may include receiving a sensed data from the plurality of ESA antenna, the sensed data representative of the threat aerial vehicle The method flow 800 may include, at a step 810, determining a threat position and a threat vector of the threat aerial vehicle based on the sensed data, and, at a step 812, establishing a directional collision avoidance communication network (DCACN) between the first aerial vehicle and at least one of the threat aerial vehicle via a directional communication system. A step 814 may include communicating with the threat aerial vehicle via the DCACN and a step 816 may include determining a threat maneuvering capability of the threat aerial vehicle based on one of: a received signal including a certification maneuvering category via the DCACN, a size-based maneuvering category based on the sensed data, and a speed-based maneuvering category based on the threat vector.

The method flow 800 may include, at a step 818, comparing the threat maneuvering capability with the first maneuvering capability, and, at a step 820, generating a first maneuver for the first aerial vehicle and a threat maneuver for the threat aerial vehicle based on the first position, the first vector, the threat position, the threat vector, and the comparison, each of the first maneuver and the threat maneuver configured to provide a separation between the first aerial vehicle and the threat aerial vehicle. The method may also include, at a step 822, directing at least one of; a pilot and an autopilot onboard the first aerial vehicle to execute the first maneuver.

CONCLUSION

As will be appreciated from the above description, embodiments of the inventive concepts disclosed herein may provide a novel solution to collision avoidance between cooperative and noncooperative aerial vehicles using a lightweight and cost-effective system.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for cooperative aerial vehicle collision avoidance, comprising:
 a plurality of electronically scanned array (ESA) antenna angularly distributed and mounted onboard a first aerial vehicle, the plurality of ESA antenna configured for a spherical radar coverage around the first aerial vehicle;
 a directional communication system onboard the first aerial vehicle configured for a directional collision avoidance communication network (DCACN) between the first aerial vehicle and at least one of a threat aerial vehicle;
 a positioning system onboard the first aerial vehicle configured for providing a three-dimensional (3D) positioning and a velocity of the first aerial vehicle;
 a controller onboard the first aerial vehicle operatively coupled with each of the plurality of ESA antenna, the directional communication system, and the positioning system;
 a tangible, non-transitory memory onboard the first aerial vehicle configured to communicate with the controller, the tangible, non-transitory memory maintains a first maneuvering capability of the first aerial vehicle, the tangible, non-transitory memory having instructions stored therein that, in response to execution by the controller, cause the controller to:
 receive a first 3D position and a first vector of the first aerial vehicle from the positioning system;
 command the plurality of ESA antenna to sense the threat aerial vehicle via the plurality of ESA antenna;
 receive a sensed data from the plurality of ESA antenna the sensed data representative of the threat aerial vehicle;
 determine a threat position and a threat vector of the threat aerial vehicle based on the sensed data;
 establish the DCACN between the first aerial vehicle and the at least one of the threat aerial vehicle via the directional communication system;
 communicate with the threat aerial vehicle via the DCACN;
 determine a threat maneuvering capability of the threat aerial vehicle based on one of: a received signal including a certification maneuvering category via the DCACN, a size-based maneuvering category based on the sensed data, and a speed-based maneuvering category based on the threat vector;
 compare the threat maneuvering capability with the first maneuvering capability;
 generate a first maneuver for the first aerial vehicle and a threat maneuver for the threat aerial vehicle based on the first 3D position, the first vector, the threat position, the threat vector, and the comparison, each of the first maneuver and the threat maneuver configured to provide a separation between the first aerial vehicle and the threat aerial vehicle;
 direct at least one of: a pilot and an autopilot onboard the first aerial vehicle to execute the first maneuver.

2. The system for cooperative aerial vehicle collision avoidance of claim 1, wherein the plurality of ESA antenna comprises at least six ESA antenna oriented in a forward aft left right top bottom configuration each of the at least six ESA antenna separated by 90 degrees.

3. The system for cooperative aerial vehicle collision avoidance of claim 1, wherein the controller is further configured to:
 command the plurality of ESA antenna to sense the threat aerial vehicle via a first ESA antenna and a second ESA antenna, the second ESA antenna adjacent to the first ESA antenna;
 determine the threat position is within a sector crossover between a first boresight of the first ESA antenna and a second boresight of the second ESA antenna;
 electrically manipulate each of the first ESA antenna and the second ESA antenna to function as a combined ESA antenna having a boresight between the first boresight and the second boresight; and
 receive the sensed data from the combined ESA antenna.

4. The system for cooperative aerial vehicle collision avoidance of claim 1, wherein the directional communication system sends and receives a data signal via one of: the plurality of ESA antenna and a directional communications antenna.

5. The system for cooperative aerial vehicle collision avoidance of claim 1, wherein one of the first maneuver or the threat maneuver is a non-maneuver based on the comparison of the threat maneuvering capability with the first maneuvering capability.

6. The system for cooperative aerial vehicle collision avoidance of claim 1, wherein the separation further comprises one of: a 1 mile horizontal and 500 ft vertical separation, a measured bubble around each of the first aerial vehicle and the threat aerial vehicle, and a range based on a human occupancy of the first aerial vehicle.

7. The system for cooperative aerial vehicle collision avoidance of claim 1, wherein the certification maneuvering category is based on a reference speed and further includes: a category A wherein the reference speed is less than 91 knots, a category B wherein the reference speed is at least 91 knots but less than 121 knots, a category C wherein the reference speed is at least 121 knots but less than 141 knots, a category D wherein the reference speed is at least 141 knots but less than 166 knots, and a category E wherein the reference speed is 166 knots or greater.

8. The system for cooperative aerial vehicle collision avoidance of claim 1, wherein the sensed data representative of the threat aerial vehicle further includes a power level of a received radar signal from the threat aerial vehicle and wherein the size-based maneuvering category is based on the power level of the received radar signal.

9. The system for cooperative aerial vehicle collision avoidance of claim 1, wherein the first maneuver and the threat maneuver further comprise one of: a turn, a climb, a descent, a vertical speed change, a speed reduction, a power reduction, a speed increase, a power increase, and a non-maneuver.

10. The system for cooperative aerial vehicle collision avoidance of claim 1, wherein the first maneuver and the threat maneuver further comprise a maneuver magnitude based on the comparison between the threat maneuvering capability and the first maneuvering capability.

11. The system for cooperative aerial vehicle collision avoidance of claim 1, wherein the first maneuver and the threat maneuver further comprise a maneuver range for each of the first and the threat maneuver based on the comparison between the threat maneuvering capability and the first maneuvering capability.

12. The system for cooperative aerial vehicle collision avoidance of claim 1, wherein the DCACN further comprises a dynamic mobile ad hoc network (MANET).

13. A method for cooperative aerial vehicle collision avoidance, comprising:
- receiving a first position and a first vector of a first aerial vehicle from a positioning system onboard the first aerial vehicle;
- receiving a first maneuvering capability of the first aerial vehicle;
- commanding a plurality of ESA antenna angularly distributed and mounted onboard the first aerial vehicle to sense a threat aerial vehicle;
- receiving a sensed data from the plurality of ESA antenna, the sensed data representative of the threat aerial vehicle;
- determining a threat position and a threat vector of the threat aerial vehicle based on the sensed data;
- establishing a directional collision avoidance communication network (DCACN) between the first aerial vehicle and at least one of the threat aerial vehicle via a directional communication system;
- communicating with the threat aerial vehicle via the DCACN;
- determining a threat maneuvering capability of the threat aerial vehicle based on one of: a received signal including a certification maneuvering category via the DCACN, a size-based maneuvering category based on the sensed data, and a speed-based maneuvering category based on the threat vector;
- comparing the threat maneuvering capability with the first maneuvering capability;
- generating a first maneuver for the first aerial vehicle and a threat maneuver for the threat aerial vehicle based on the first position, the first vector, the threat position, the threat vector, and the comparison, each of the first maneuver and the threat maneuver configured to provide a separation between the first aerial vehicle and the threat aerial vehicle;
- directing at least one of a pilot and an autopilot onboard the first aerial vehicle to execute the first maneuver.

14. The method for cooperative aerial vehicle collision avoidance of claim 13, wherein commanding a plurality of ESA antenna angularly distributed and mounted onboard the first aerial vehicle to sense a threat aerial vehicle further comprises;
- commanding the plurality of ESA antenna to sense the threat aerial vehicle via a first ESA antenna and a second ESA antenna, the second ESA antenna adjacent to the first ESA antenna;
- determining the threat position is between a first boresight of the first ESA antenna and a second boresight of the second ESA antenna;
- electrically manipulating each of the first ESA antenna and the second ESA antenna to function as a combined ESA antenna; and
- receiving the sensed data from the combined ESA antenna.

15. The method for cooperative aerial vehicle collision avoidance of claim 13, wherein determining the threat position and the threat vector of the threat aerial vehicle based on the sensed data further comprises:
- storing the threat position, the threat vector, a threat time, and the threat maneuvering capability as a threat instance within the memory;
- retrieving at least one of the threat instance from the memory;
- determining a multiple of threat instance is a congestion location; and
- directing at least one of: the pilot and the autopilot onboard the first aerial vehicle to avoid the congestion location.

* * * * *